US010088812B2

(12) United States Patent
Kubota

(10) Patent No.: US 10,088,812 B2
(45) Date of Patent: Oct. 2, 2018

(54) FUNCTION UNIT, ANALOG INPUT UNIT, AND PROGRAMMABLE CONTROLLER SYSTEM

(71) Applicant: Mitsubishi Electric Corporation, Chiyoda-ku, Tokyo (JP)

(72) Inventor: Yoshiyuki Kubota, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 271 days.

(21) Appl. No.: 14/902,874

(22) PCT Filed: Apr. 25, 2014

(86) PCT No.: PCT/JP2014/061772
§ 371 (c)(1),
(2) Date: Jan. 5, 2016

(87) PCT Pub. No.: WO2015/162792
PCT Pub. Date: Oct. 29, 2015

(65) Prior Publication Data
US 2016/0154387 A1 Jun. 2, 2016

(51) Int. Cl.
*G05B 19/05* (2006.01)
*G05B 13/02* (2006.01)
*G05B 15/02* (2006.01)

(52) U.S. Cl.
CPC ......... *G05B 13/0205* (2013.01); *G05B 15/02* (2013.01); *G05B 19/052* (2013.01); *G05B 19/054* (2013.01)

(58) Field of Classification Search
CPC .................. G05B 13/0205; G05B 19/054; G05B 19/052; G05B 15/02
See application file for complete search history.

(56) References Cited

U.S. PATENT DOCUMENTS 4,996,639 A * 2/1991 Ishimoto ............. G06F 3/05
712/242
5,812,880 A 9/1998 Goto et al.
(Continued)

FOREIGN PATENT DOCUMENTS

DE 112009004529 T5 10/2012
JP 05-173985 A 7/1993
(Continued)

OTHER PUBLICATIONS

International Search Report for PCT/JP2014/061772 dated Apr. 25, 2014 [PCT/ISA/210].
(Continued)

*Primary Examiner* — Robert E Fennema
*Assistant Examiner* — Marzia T Monty
(74) *Attorney, Agent, or Firm* — Sughrue Mion, PLLC; Richard C. Turner

(57) ABSTRACT

A functional unit includes: a parameter reception unit that classifies a parameter as a first parameter or as a second parameter; a first-parameter analysis unit that analyzes the classified first parameter; a second-parameter analysis unit that analyzes the classified second parameter; a first-parameter storage unit that stores therein the first parameter analyzed by the first-parameter analysis unit; a second-parameter storage unit that stores therein the second parameter analyzed by the second-parameter analysis unit; a first processing unit that controls the first function in accordance with the first parameter stored in the first-parameter storage unit; and a second processing unit that controls the second function in accordance with the second parameter stored in the second-parameter storage unit, wherein the functional unit is controlled by a plurality of controllers.

10 Claims, 3 Drawing Sheets

(56) References Cited

U.S. PATENT DOCUMENTS

| | | | |
|---|---|---|---|
| 5,859,847 A | 1/1999 | Dew et al. | |
| 2008/0126497 A1* | 5/2008 | Laio | G05B 19/052 709/208 |
| 2011/0307635 A1* | 12/2011 | Onishi | G05B 19/054 710/54 |
| 2015/0263748 A1 | 9/2015 | Ochiai | |

FOREIGN PATENT DOCUMENTS

| | | |
|---|---|---|
| JP | 07-044090 A | 2/1995 |
| JP | 08-249021 A | 9/1996 |
| JP | 2001-067107 A | 3/2001 |
| JP | 5122000 B2 | 1/2013 |
| JP | 5301060 B1 | 9/2013 |
| WO | 2010/109729 A1 | 9/2010 |

OTHER PUBLICATIONS

Written Opinion for PCT/JP2014/061772 dated Apr. 25, 2014 [PCT/ISA/237].
German Office Action No. 112014003069.4 dated Sep. 26, 2016.

* cited by examiner

FUNCTION UNIT, ANALOG INPUT UNIT, AND PROGRAMMABLE CONTROLLER SYSTEM

CROSS REFERENCE TO RELATED APPLICATIONS

This application is a National Stage of International Application No. PCT/JP2014/061772 filed Apr. 25, 2014, the contents of all of which are incorporated herein by reference in their entirety.

FIELD

The present invention relates to a functional unit, an analog input unit, and a programmable controller system.

BACKGROUND

When analog signals, such as current values and voltage values, output from various sensors are input into a programmable controller (PLC), an A/D conversion unit, which is an analog input unit for converting input analog data values to digital values, is used. The CPU unit of the PLC then performs various controls in accordance with the input values that have been converted to digital values.

Further, as well as digital values that are the results of A/D conversion performed by the analog input unit being used as input information for control processes performed by the CPU unit, they are also used in some cases for data collection for the purpose of, for example, traceability of quality information, i.e., logging.

With regard to the technologies related to logging performed by analog input units, an analog input unit is disclosed, for example, in Patent Literature 1 that is configured to reserve a log storage area having a ring buffer configuration in a shared memory and to store, in the shared memory, a head pointer indicating the boundary address between the latest log data and the oldest log data among the log data stored in the log storage area.

Moreover, an analog conversion device is disclosed, for example, in Patent Literature 2 that is configured such that the given-point-number logging detection unit monitors the number of pieces of logging data stored in the first storage unit and the interrupt generation unit performs an interrupt generation request with respect to the CPU unit when the number of pieces of logging data reaches a predetermined number.

With both the technologies described in Patent Literature 1 and Patent Literature 2, the CPU unit, which manages and controls the analog input unit, reads and stores a sequence of digital values collected by the analog input unit. However, there is a problem in that when the CPU unit manages and controls a plurality of analog input units and executes multi-channel logging, the data collection process is delayed in some cases and this has an effect on the control cycle of the control that should actually be performed.

Moreover, there is a technology disclosed for managing and controlling one analog input unit by a plurality of CPU units. For example, a CPU system is disclosed in Patent Literature 3 that includes, as CPU units, a first electronic control device, which mainly engages in a process related to data input/output, and a second electronic control device, which mainly engages in execution of various calculations using data.

CITATION LIST

Patent Literature

Patent Literature 1: Japanese Patent No. 5122000
Patent Literature 2: Japanese Patent No. 5301060
Patent Literature 3: Japanese Patent Application Laid-open No. H08-249021

SUMMARY

Technical Problem

However, with the technology described in Patent Literature 3, the second electronic control device, which is a second CPU unit, accesses the A/D conversion device via the first electronic control device, which is a first CPU unit. In such a case, the first electronic control device sets operation settings of the A/D conversion device but the second electronic control device cannot set operation settings of the A/D conversion device. Accordingly, the second electronic control device can operate the A/D conversion device only within the range of the operation settings of the A/D conversion device as set by the first electronic control device. As a result, there is a problem in that each of the first electronic control device and the second electronic control device cannot perform independent control with unique settings.

The present invention has been achieved in view of the above and an object of the present invention is to provide a functional unit, an analog input unit, and a programmable controller system with which different functions in one functional unit of a programmable controller system can be controlled by a plurality of control units.

Solution to Problem

In order to solve the above problems and achieve the object, a functional unit according to an aspect of the present invention is a functional unit that is included in a programmable controller system that includes a plurality of controllers having different control functions, the functional unit including: a parameter reception unit that classifies a parameter that is output from the controllers and input to the functional unit as a first parameter, which is output from a first controller of the controllers and is used for setting control of a first function in the functional unit, or as a second parameter, which is output from a second controller of the controllers and is used for setting control of a second function in the functional unit; a first-parameter analysis unit that analyzes the first parameter classified by the parameter reception unit; a second-parameter analysis unit that analyzes the second parameter classified by the parameter reception unit; a first-parameter storage unit that stores therein the first parameter analyzed by the first-parameter analysis unit; a second-parameter storage unit that stores therein the second parameter analyzed by the second-parameter analysis unit; a first processing unit that controls the first function in accordance with the first parameter stored in the first-parameter storage unit; and a second processing unit that controls the second function in accordance with the second parameter stored in the second-parameter storage unit, wherein the functional unit is controlled by the plurality of controllers.

Advantageous Effects of Invention

According to the present invention, an effect is obtained where different functions in one functional unit of a programmable controller system can be controlled by a plurality of control units.

DESCRIPTION OF EMBODIMENTS

Exemplary embodiments of a functional unit, an analog input unit, and a programmable controller system according to the present invention will be explained below in detail with reference to the drawings. The present invention is not limited to the following descriptions and can be appropriately changed without departing from the scope of the present invention.

Embodiment

Figure 1:
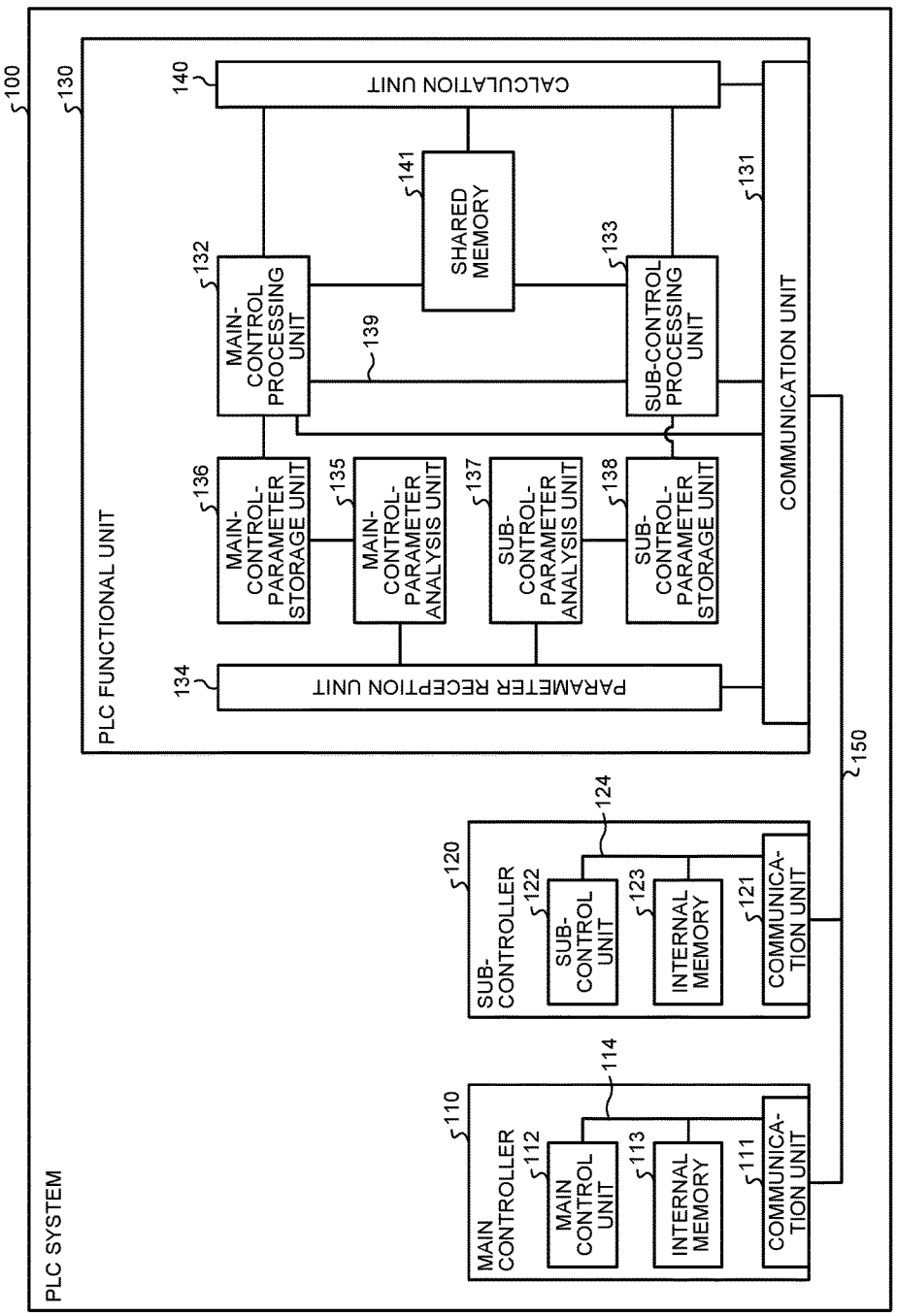
FIG. 1 is a block diagram describing the configuration of a PLC system according to an embodiment of the present invention.

FIG. 1 is a block diagram describing the configuration of a PLC system 100 according to an embodiment of the present invention. The PLC system 100 illustrated in FIG. 1 includes a PLC functional unit 130, a main controller 110, and a sub-controller 120. The main controller 110 and the sub-controller 120 are a plurality of CPU units that manage and control the PLC functional unit 130.

The PLC functional unit 130 is a unit that is incorporated in the PLC system and is connected to the main controller 110 and the sub-controller 120 via an inter-unit bus 150. The PLC functional unit 130, the main controller 110, and the sub-controller 120 each form part of the PLC system 100.

In addition to the PLC functional unit 130, the main controller 110, and the sub-controller 120, various functional units (not illustrated) are connected via the inter-unit bus 150 in the PLC system 100 depending on the purposes.

The various functional units incorporated in the PLC system 100, for example, include a motion controller unit that performs multi-axis position control using servo amplifiers or the like and a temperature controller unit that outputs a temperature control signal for controlling the heating and cooling so that the temperature indicated by the main controller 110 is reached. In this embodiment, units other than the PLC functional unit 130, the main controller 110, and the sub-controller 120 are not referred to.

The PLC functional unit 130 includes a communication unit 131, a main-control processing unit 132, a sub-control processing unit 133, a parameter reception unit 134, a main-control-parameter analysis unit 135, a main-control-parameter storage unit 136, a sub-control-parameter analysis unit 137, a sub-control-parameter storage unit 138, an internal bus 139, a calculation unit 140, and a shared memory 141. These components are communicatively connected to each other by the internal bus 139.

The communication unit 131 communicates with the main controller 110 and the sub-controller 120 via the inter-unit bus 150.

The main-control processing unit 132 performs main control, which is the primary function of the PLC functional unit 130. Moreover, the main-control processing unit 132 can communicate, via the communication unit 131 and the inter-unit bus 150, input/output information on the main control with the main controller 110 and the sub-controller 120.

The sub-control processing unit 133 performs sub-control, which is the auxiliary function in the control performed by the PLC functional unit 130. Moreover, the sub-control processing unit 133 can communicate, via the communication unit 131 and the inter-unit bus 150, input/output information on the sub-control with the main controller 110 and the sub-controller 120. Moreover, the sub-control processing unit 133 can directly receive output of the execution results from the main-control processing unit 132 via the internal bus 139. The sub-control processing unit 133 performs the sub-control on the PLC functional unit 130 by using the content of the output directly received from the main-control processing unit 132.

The parameter reception unit 134 receives, via the inter-unit bus 150 and the communication unit 131, parameters that are output from the main controller 110 and the sub-controller 120 and are necessary for setting the operations of the PLC functional unit 130. The parameter reception unit 134 classifies the received parameters by determining whether the received parameters are a main control parameter or a sub-control parameter. The parameter reception unit 134 outputs a main control parameter to the main-control-parameter analysis unit 135 and outputs a sub-control parameter to the sub-control-parameter analysis unit 137. When the received parameter is neither a main control parameter nor a sub-control parameter, the parameter reception unit 134 discards the parameter. The main control parameter is the setting condition necessary for operating the main-control processing unit 132. The sub-control parameter is the setting condition necessary for operating the sub-control processing unit 133.

The main-control-parameter analysis unit 135 performs an analysis process on the main control parameter input from the parameter reception unit 134. The main-control-parameter analysis unit 135 analyzes the conditions of the parameter, such as the type of the input main control parameter and the storage location in the main-control-parameter storage unit 136. The main-control-parameter analysis unit 135 outputs the main control parameter that has been analyzed to the main-control-parameter storage unit 136.

The sub-control-parameter analysis unit 137 performs an analysis process on the sub-control parameter input from the parameter reception unit 134. The sub-control-parameter analysis unit 137 analyzes the conditions of the parameter, such as the type of the input sub-control parameter and the storage location in the sub-control-parameter storage unit 138. The sub-control-parameter analysis unit 137 outputs the sub-control parameter that has been analyzed to the sub-control-parameter storage unit 138.

The main-control-parameter storage unit 136 stores the main control parameter that has been analyzed and output from the main-control-parameter analysis unit 135. The main-control processing unit 132 performs the main control in accordance with the main control parameter read from the main-control-parameter storage unit 136. The main-control-parameter analysis unit 135 causes the main control parameter that has been analyzed to be output to and stored in the main-control-parameter storage unit 136 so as to change and set the main control parameter. When the main-control-parameter analysis unit 135 analyzes the main control parameter, the main-control processing unit 132 and the sub-control processing unit 133 stop the control process.

The sub-control-parameter storage unit 138 stores the sub-control parameter that has been analyzed and output from the sub-control-parameter analysis unit 137. The sub-control processing unit 133 performs the sub-control in accordance with the sub-control parameter read from the sub-control-parameter storage unit 138. The sub-control-parameter analysis unit 137 causes the sub-control parameter that has been analyzed to be output to and stored in the sub-control-parameter storage unit 138 so as to change and set the sub-control parameter. When the sub-control-parameter analysis unit 137 analyzes the sub-control parameter, the sub-control processing unit 133 stops the sub-control process.

The calculation unit 140 performs overall control of the PLC functional unit 130.

The shared memory 141 stores, for example, data generated during the processes performed in the PLC functional unit 130, such as the results of calculations performed by the main-control processing unit 132 and the sub-control processing unit 133. The calculation unit 140 can read and write data from and to the shared memory 141. Moreover, the main controller 110 and the sub-controller 120 can access, via the inter-unit bus 150, the shared memory 141 to read data.

Next, the main controller 110 and the sub-controller 120 will be explained. The main controller 110 performs the main control, which is the primary function in the control performed by the PLC system 100. The main control includes execution of a user program that is a program for controlling industrial equipment by operating various units included in the PLC system 100; output of the execution results; and acquisition of input values, such as values used in the user program. The main controller 110 includes a communication unit 111, a main control unit 112, and an internal memory 113. These components are connected to each other via an internal bus 114.

The communication unit 111 communicates with the PLC functional unit 130 via the inter-unit bus 150. The main control unit 112 performs the main control by executing a user program and performing overall control of the main controller 110. Moreover, the main control unit 112 outputs a main control parameter to the PLC functional unit 130 via the communication unit 111.

The internal memory 113 stores therein a user program, data necessary for executing the user program, input/output values of the user program, and the like.

The sub-controller 120 performs the sub-control, which is the auxiliary function in the control performed by the PLC system 100. The sub-control includes execution of a user program that is a program for controlling industrial equipment by operating various units included in the PLC system 100; output of the execution results; and acquisition of input values, such as values used in the user program. The sub-controller 120 includes a communication unit 121, a sub-control unit 122, and an internal memory 123. These components are connected to each other via an internal bus 124.

The communication unit 121 communicates with the PLC functional unit 130 via the inter-unit bus 150. The sub-control unit 122 performs the sub-control by executing a user program and performing overall control of the sub-controller 120. Moreover, the sub-control unit 122 outputs a sub-control parameter to the PLC functional unit 130 via the communication unit 121.

The internal memory 123 stores therein a user program, data necessary for executing the user program, input/output values of the user program, and the like.

With the PLC system 100 according to the above embodiment, after the parameter reception unit 134 of the PLC functional unit 130 collectively receives parameters that are output from the main controller 110 and the sub-controller 120 and are necessary for the operations of the PLC functional unit 130, the parameter reception unit 134 classifies the parameters as a main control parameter or as a sub-control parameter. Moreover, the PLC functional unit 130 includes, for each of the main control parameter and the sub-control parameter, an analysis processing unit that performs an analysis process after the parameter reception unit 134 receives parameters and a storage unit that stores therein parameters that have been analyzed. Specifically, the PLC functional unit 130 includes the main-control-parameter analysis unit 135 and the main-control-parameter storage unit 136 for the main control parameter and the PLC functional unit 130 also includes the sub-control-parameter analysis unit 137 and the sub-control-parameter storage unit 138 for the sub-control parameter.

With the PLC system 100 according to the present embodiment, the PLC functional unit 130 can separately receive each of the parameter necessary for the basic main control from the main controller 110, which takes on the main control performed by the PLC system 100, and the parameter necessary for the sub-control from the sub-controller 120, which takes on the auxiliary function in the control performed by the PLC system 100. Accordingly, the PLC functional unit 130 can be managed and controlled by a plurality of controllers.

Figure 2:
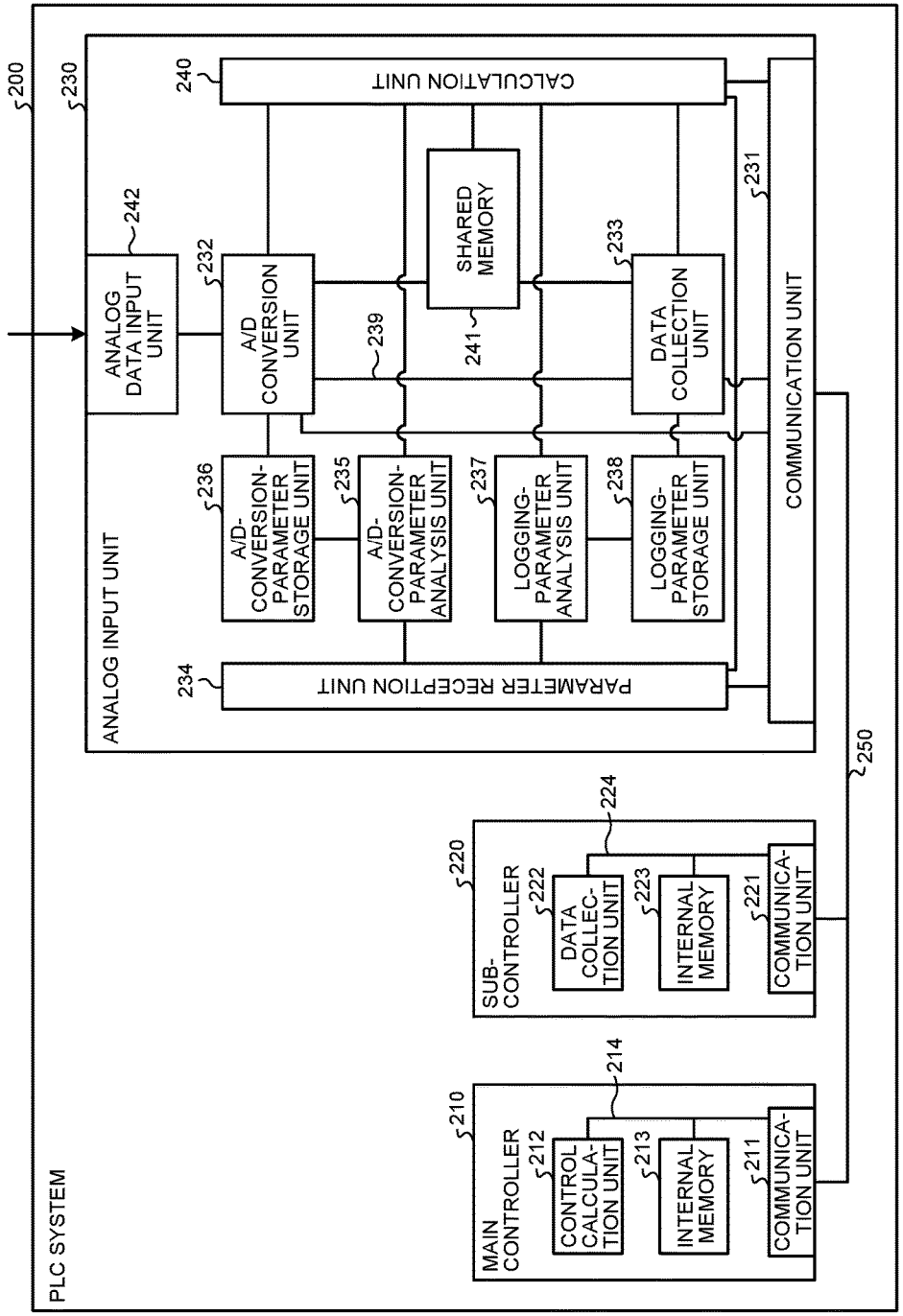
FIG. 2 is a block diagram describing the configuration of a PLC system according to the embodiment of the present invention.

Next, the PLC system 100 described above will be explained more specifically. FIG. 2 is a block diagram describing the configuration of a PLC system 200 according to the embodiment. The PLC system 200 illustrated in FIG. 2 includes an analog input unit 230, which is an analog input unit, a main controller 210, and a sub-controller 220. The main controller 210 and the sub-controller 220 are a plurality of controllers that manage and control the analog input unit 230. The analog input unit 230, the main controller 210, and the sub-controller 220 correspond to the PLC functional unit 130, the main controller 110, and the sub-controller 120 of the PLC system 100, respectively.

The analog input unit 230 is a unit that is incorporated in the PLC system 200 and is connected to the main controller 210 and the sub-controller 220 via an inter-unit bus 250. The analog input unit 230, the main controller 210, and the sub-controller 220 each form part of the PLC system 200.

The analog input unit 230 includes a communication unit 231, an A/D conversion unit 232, a data collection unit 233, a parameter reception unit 234, an A/D-conversion-parameter analysis unit 235, an A/D-conversion-parameter storage unit 236, a logging-parameter analysis unit 237, a logging-parameter storage unit 238, an internal bus 239, a calculation unit 240, a shared memory 241, and an analog data input unit 242. These components are communicatively connected to each other by the internal bus 239.

The communication unit 231, the A/D conversion unit 232, the data collection unit 233, the parameter reception unit 234, the A/D-conversion-parameter analysis unit 235, the A/D-conversion-parameter storage unit 236, the logging-parameter analysis unit 237, the logging-parameter storage unit 238, the internal bus 239, the calculation unit 240, and the shared memory 241 correspond to the communication unit 131, the main-control processing unit 132, the sub-control processing unit 133, the parameter reception unit 134, the main-control-parameter analysis unit 135, the main-control-parameter storage unit 136, the sub-control-parameter analysis unit 137, the sub-control-parameter storage unit 138, the internal bus 139, the calculation unit 140, and the shared memory 141 of the PLC functional unit 130, respectively.

The communication unit 231 communicates with the main controller 210 and the sub-controller 220 via the inter-unit bus 250.

The A/D conversion unit 232 performs an A/D conversion process, which is the primary function of the analog input unit 230. The A/D conversion unit 232 receives input of analog values to the analog input unit 230 from an external source via the analog data input unit 242 and sequentially converts the input analog values to digital values. Various measurements related to industrial equipment and the like that are controlled by the PLC system 200, such as a flow rate, pressure, and temperature, are converted to current values or voltage values that are analog values and are input to the analog input unit 230 from various sensors. The A/D conversion unit 232 can communicate, via the communication unit 231 and the inter-unit bus 250, input/output information on the A/D conversion control including the results of A/D conversion with the main controller 210 and the sub-controller 220.

The data collection unit 233 performs a data collection process, i.e., a logging process, which is the auxiliary function in the control performed by the analog input unit 230. Moreover, the data collection unit 233 can communicate, via the communication unit 231 and the inter-unit bus 250, input/output information on the data collection process with the main controller 210 and the sub-controller 220. Moreover, the data collection unit 233 can directly receive output of the execution results from the A/D conversion unit 232 via the internal bus 239. The data collection unit 233 sequentially logs the data directly received from the A/D conversion unit 232. The data collection unit 233 may include a memory therein and log the data received from the A/D conversion unit 232 in the memory or may log the data in the shared memory 241.

The parameter reception unit 234 receives, via the inter-unit bus 250 and the communication unit 231, parameters that are output from the main controller 210 and the sub-controller 220 and are necessary for the operations of the analog input unit 230. The parameter reception unit 234 classifies the received parameters by determining whether the received parameters are an A/D conversion parameter or a logging parameter. The parameter reception unit 234 outputs an A/D conversion parameter to the A/D-conversion-parameter analysis unit 235 and outputs a logging parameter to the logging-parameter analysis unit 237. When the received parameter is neither an A/D conversion parameter nor a logging parameter, the parameter reception unit 234 discards the parameter. The A/D conversion parameter is the setting condition for operating the A/D conversion unit 232. The logging parameter is the setting condition for operating the data collection unit 233.

The A/D-conversion-parameter analysis unit 235 performs an analysis process on the A/D conversion parameter input from the parameter reception unit 234. The A/D-conversion-parameter analysis unit 235 analyzes the conditions of the parameter, such as the type of the input A/D conversion parameter and the storage location in the A/D-conversion-parameter storage unit 236. The A/D-conversion-parameter analysis unit 235 outputs the A/D conversion parameter that has been analyzed to the A/D-conversion-parameter storage unit 236.

The logging-parameter analysis unit 237 performs an analysis process on the logging parameter input from the parameter reception unit 234. The logging-parameter analysis unit 237 analyzes the conditions of the parameter, such as the type of the input logging parameter and the storage location in the logging-parameter storage unit 238. The logging-parameter analysis unit 237 outputs the logging parameter that has been analyzed to the logging-parameter storage unit 238.

The A/D-conversion-parameter storage unit 236 stores the A/D conversion parameter that has been analyzed and output from the A/D-conversion-parameter analysis unit 235. The A/D conversion unit 232 performs the A/D conversion process in accordance with the A/D conversion parameter read from the A/D-conversion-parameter storage unit 236. The A/D-conversion-parameter analysis unit 235 causes the A/D conversion parameter that has been analyzed to be output to and stored in the A/D-conversion-parameter storage unit 236 so as to change and set the A/D conversion parameter. When the A/D-conversion-parameter analysis unit 235 analyzes the A/D conversion parameter, the A/D conversion unit 232 and the data collection unit 233 stop the A/D conversion process and the data collection process.

The logging-parameter storage unit 238 stores the logging parameter that has been analyzed and output from the logging-parameter analysis unit 237. The data collection unit 233 performs the data collection process in accordance with the logging parameter read from the logging-parameter storage unit 238. The logging-parameter analysis unit 237 causes the logging parameter that has been analyzed to be output to and stored in the logging-parameter storage unit 238 so as to change and set the logging parameter. When the logging-parameter analysis unit 237 analyzes the logging parameter, the data collection unit 233 stops the data collection process.

The analog data input unit 242 receives input of analog values from an external source and outputs them to the A/D conversion unit 232.

The calculation unit 240 performs overall control of the analog input unit 230.

The shared memory 241 stores, for example, data generated during the processes performed in the analog input unit 230, such as the results of calculations performed by the A/D conversion unit 232 or data collected by the data collection unit 233. The calculation unit 240 can read and write data from and to the shared memory 241. Moreover, the main controller 210 and the sub-controller 220 can access, via the inter-unit bus 250, the shared memory 241 to read data.

Next, the main controller 210 and the sub-controller 220 will be explained. The main controller 210 performs main control, which is the primary function in the control performed by the PLC system 200. The main control includes execution of a user program that is a program for controlling industrial equipment by operating various units included in the PLC system 200; output of the execution results; and acquisition of input values, such as values used in the user program. The main controller 210 reads the data converted to digital values by the A/D conversion unit 232 and controls industrial equipment in accordance with the data by operating various units included in the PLC system 200, and it also manages and controls the A/D conversion process performed by the analog input unit 230.

The main controller 210 includes a communication unit 211, a control calculation unit 212, and an internal memory 213. The communication unit 211, the control calculation unit 212, and the internal memory 213 are connected to each other via an internal bus 214. The communication unit 211, the control calculation unit 212, the internal memory 213, and the internal bus 214 correspond to the communication unit 111, the main control unit 112, the internal memory 113, and the internal bus 114 of the main controller 110, respectively.

The communication unit 211 communicates with the analog input unit 230 via the inter-unit bus 250. The control calculation unit 212 executes a user program for the main control and for managing and controlling the A/D conversion process and overall control of the main controller 210. Moreover, the control calculation unit 212 outputs an A/D conversion parameter to the analog input unit 230 via the communication unit 211.

The internal memory 213 stores therein a user program, data necessary for executing the user program, input/output values of the user program, and the like.

The sub-controller 220 performs sub-control, which is the auxiliary function in the control performed by the PLC system 200. The sub-control includes execution of a user program that is a program for controlling industrial equipment by operating various units included in the PLC system 200; output of the execution results; and acquisition of input values, such as values used in the user program. In this embodiment, the sub-controller 220 reads the data that has been converted to digital values and has been logged in the data collection unit 233 of the analog input unit 230 and logs the data.

The sub-controller 220 includes a communication unit 221, a data collection unit 222, and an internal memory 223. The communication unit 221, the data collection unit 222, and the internal memory 223 are connected to each other via an internal bus 224. The communication unit 221, the data collection unit 222, the internal memory 223, and the internal bus 224 correspond to the communication unit 121, the sub-control unit 122, the internal memory 123, and the internal bus 124 of the sub-controller 120, respectively.

The communication unit 221 communicates with the analog input unit 230 via the inter-unit bus 250. The data collection unit 222 reads the data that has been converted to digital values and has been logged in the data collection unit 233 of the analog input unit 230 and logs the data. The data collection unit 222 may log the data read from the data collection unit 222 of the analog input unit 230 in the memory included in the data collection unit 233 or may log the data in the internal memory 223. The data collection unit 222 executes a user program and performs overall control of the sub-controller 220. Moreover, the data collection unit 222 outputs a logging parameter to the analog input unit 230 via the communication unit 221.

The internal memory 223 stores therein a user program, data necessary for executing the user program, input/output values of the user program, and the like. Moreover, the internal memory 223 logs the data read from the data collection unit 233 of the analog input unit 230.

Figure 3:
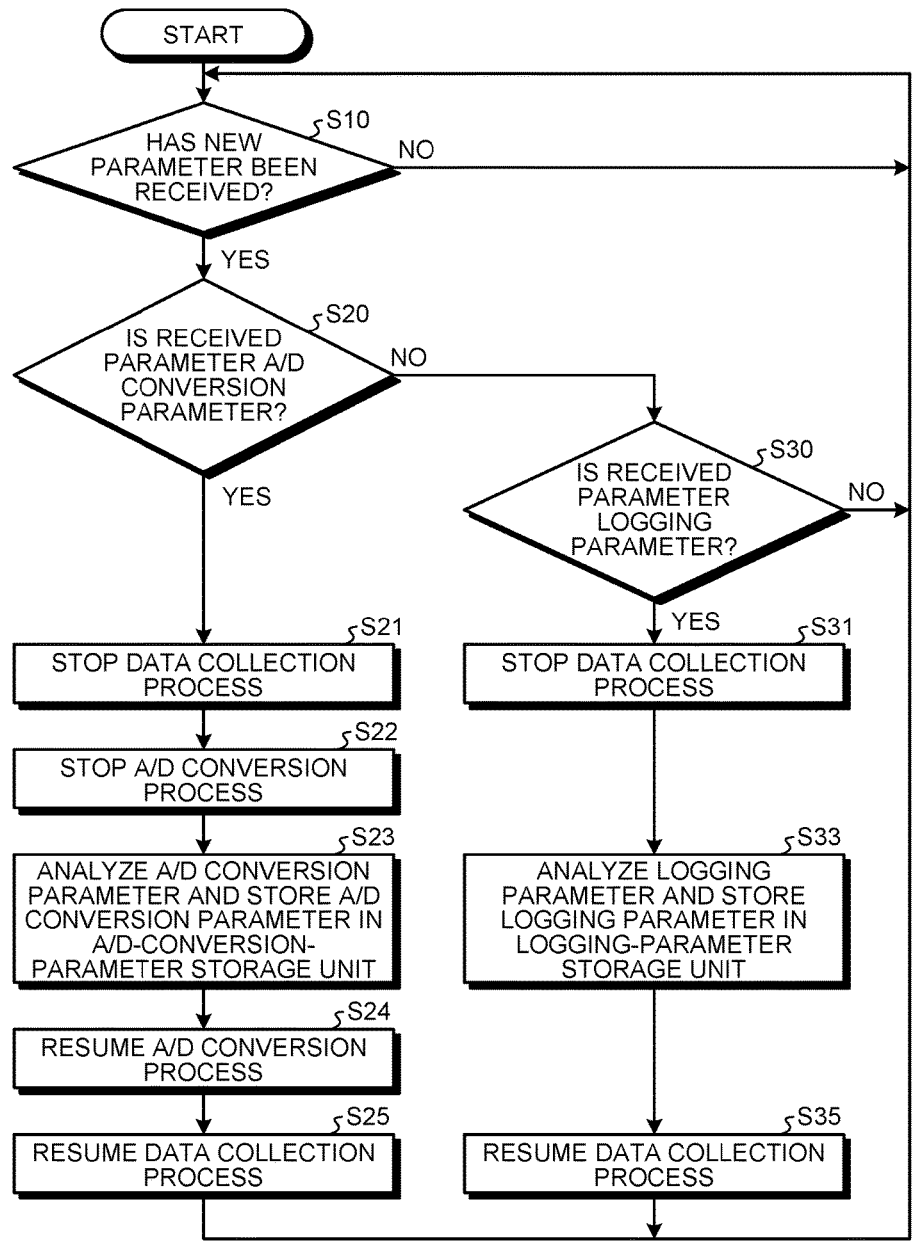
FIG. 3 is a flowchart describing operations when a parameter reception unit of an analog input unit receives parameters from a main controller and a sub-controller.

Next, operations of the PLC system 200 will be explained. FIG. 3 is a flowchart describing operations when the parameter reception unit 234 of the analog input unit 230 receives parameters from the main controller 210 and the sub-controller 220.

First, the parameter reception unit 234 determines whether a new parameter has been received (Step S10). When the parameter reception unit 234 has not received a new parameter (No at Step S10), the parameter reception unit 234 continues the determination process. When the parameter reception unit 234 has received a new parameter (Yes at Step S10), the parameter reception unit 234 determines whether the received parameter is an A/D conversion parameter (Step S20).

When the received parameter is an A/D conversion parameter (Yes at Step S20), the data collection process performed by the data collection unit 233 is stopped in preparation for transition to the analysis of the parameter (Step S21). Next, the A/D conversion process performed by the A/D conversion unit 232 is stopped (Step S22).

In order to stop the data collection process, for example, the parameter reception unit 234 outputs, to the calculation unit 240, A/D-conversion-parameter reception information indicating that an A/D conversion parameter has been received. When the calculation unit 240 receives the A/D-conversion-parameter reception information, the calculation unit 240 outputs, to the data collection unit 233, data-collection-process stop instruction information for stopping the data collection process. When the data collection unit 233 receives the data-collection-process stop instruction information, the data collection unit 233 stops the data collection process.

In order to stop the A/D conversion process performed by the A/D conversion unit 232, for example, after the calculation unit 240 outputs the data-collection-process stop instruction information to the data collection unit 233, the calculation unit 240 outputs, to the A/D conversion unit 232, A/D-conversion-process stop instruction information indicating that the A/D conversion process is to be stopped. When the A/D conversion unit 232 receives the A/D-conversion-process stop instruction information, the A/D conversion unit 232 stops the A/D conversion process.

Next, the parameter reception unit 234 outputs the received A/D conversion parameter to the A/D-conversion-parameter analysis unit 235. When the A/D-conversion-parameter analysis unit 235 receives the A/D conversion parameter, the A/D-conversion-parameter analysis unit 235 analyzes the A/D conversion parameter and stores the analyzed A/D conversion parameter in an appropriate area in the A/D-conversion-parameter storage unit 236 (Step S23). Accordingly, the new A/D conversion parameter is set in the A/D-conversion-parameter storage unit 236.

Thereafter, the A/D conversion process performed by the A/D conversion unit 232 is resumed (Step S24). Then, the data collection process performed by the data collection unit 233 is resumed (Step S25). In order to resume the A/D conversion process performed by the A/D conversion unit 232, for example, the A/D-conversion-parameter analysis unit 235 outputs, to the calculation unit 240, A/D-conversion-parameter storage information indicating that the analyzed A/D conversion parameter has been stored in the A/D-conversion-parameter storage unit 236. When the calculation unit 240 receives the A/D-conversion-parameter storage information, the calculation unit 240 outputs, to the A/D conversion unit 232, A/D-conversion-process resumption instruction information indicating that the A/D conversion process is to be resumed. When the A/D conversion unit 232 receives the A/D-conversion-process resumption instruction information, the A/D conversion unit 232 resumes the A/D conversion process.

In order to resume the data collection process performed by the data collection unit 233, for example, after the calculation unit 240 outputs the A/D-conversion-process resumption instruction information to the A/D conversion unit 232, the calculation unit 240 outputs, to the data collection unit 233, data-collection-process resumption instruction information indicating that the data collection process is to be resumed. When the data collection unit 233 receives the data-collection-process resumption instruction information, the data collection unit 233 resumes the data collection process. Thereafter, the process returns to Step S10 again.

The description refers back to Step S20. When the received parameter is not an A/D conversion parameter (No at Step S20), the parameter reception unit 234 determines whether the parameter is a logging parameter (Step S30). When the received parameter is not a logging parameter (No at Step S30), the process returns to Step S10 again.

In contrast, when the received parameter is a logging parameter (Yes at Step S30), the data collection process performed by the data collection unit 233 is stopped in preparation for transition to the analysis of the parameter (Step S31).

In order to stop the data collection process, for example, the parameter reception unit 234 outputs, to the calculation unit 240, logging-parameter reception information indicating that a logging parameter has been received. When the calculation unit 240 receives the logging-parameter reception information, the calculation unit 240 outputs, to the data collection unit 233, data-collection-process stop instruction information for stopping the data collection process. When the data collection unit 233 receives the data-collection-process stop instruction information, the data collection unit 233 stops the data collection process.

Next, the parameter reception unit 234 outputs the received logging parameter to the logging-parameter analysis unit 237. When the logging-parameter analysis unit 237 receives the logging parameter, the logging-parameter analysis unit 237 analyzes the logging parameter and stores the analyzed logging parameter in an appropriate area in the logging-parameter storage unit 238 (Step S33). Accordingly, the new logging parameter is set in the logging-parameter storage unit 238.

Thereafter, the data collection process performed by the data collection unit 233 is resumed (Step S35). In order to resume the data collection process performed by the data collection unit 233, for example, the logging-parameter analysis unit 237 outputs, to the calculation unit 240, logging-parameter storage information indicating that the analyzed logging parameter has been stored in the logging-parameter storage unit 238. When the calculation unit 240 receives the logging-parameter storage information, the calculation unit 240 outputs, to the data collection unit 233, data-collection-process resumption instruction information indicating that the data collection process is to be resumed. When the data collection unit 233 receives the data-collection-process resumption instruction information, the data collection unit 233 resumes the data collection process. Thereafter, the process returns to Step S10 again. The method of stopping or resuming the data collection process and the A/D conversion process is not limited to the above.

As described above, with the PLC system 200, when the received parameter is an A/D conversion parameter, after the data collection process and the A/D conversion process are sequentially stopped, the A/D conversion parameter is stored and set in the A/D-conversion-parameter storage unit 236. In contrast, when the received parameter is a logging parameter, after the data collection process is stopped, the logging parameter is stored and set in the logging-parameter storage unit 238.

Accordingly, when only a logging parameter is changed, only the analysis process of the logging parameter is performed without stopping the A/D conversion process; therefore, the A/D conversion process, which is the main control, can be continued without being stopped.

If the A/D conversion process and the data collection process are not independent from each other, for example, a problem occurs in that the logging process can be performed only within the operation range of the A/D conversion process. With the PLC system 200 described above, after the parameter reception unit 234 of the analog input unit 230 collectively receives parameters that are output from the main controller 210 and the sub-controller 220 and are necessary for the operations of the analog input unit 230, the parameter reception unit 234 classifies the parameters as an A/D conversion parameter or as a logging parameter. Moreover, the analog input unit 230 includes, for each of the A/D conversion parameter and the logging parameter, an analysis processing unit that performs an analysis process after the parameter reception unit 234 receives parameters and a storage unit that stores therein parameters that have been analyzed. Specifically, the analog input unit 230 includes the A/D-conversion-parameter analysis unit 235 and the A/D-conversion-parameter storage unit 236 for the A/D conversion parameter and the analog input unit 230 also includes the logging-parameter analysis unit 237 and the logging-parameter storage unit 238 for the logging parameter.

With the PLC system 200 configured as above, the analog input unit 230 incorporated in the PLC system 200 can separately receive each of the A/D conversion parameter necessary for the basic A/D conversion from the main controller 210, which takes on the main control performed by the PLC system 200, and the logging parameter necessary for the logging process from the sub-controller 220, which takes on the auxiliary function in the control performed by the PLC system 200. Accordingly, the PLC system 200 can be managed and controlled by a plurality of controllers. Moreover, the PLC system 200 includes parameter analysis processing units for respective controllers; therefore, an effect is obtained where, even when the PLC system 200 receives a parameter change request from the sub-controller 220, the PLC system 200 can continue the main control and thus can continue the control by the main controller 210 without stopping it. Therefore, the analog input unit 230 can be managed and controlled separately by a plurality of controllers.

For example, in the case of the PLC system having a configuration in which the second controller corresponding to the sub-controller accesses the analog input unit via the first controller corresponding to the main controller, such as the configuration of the CPU system disclosed in Cited Reference 3, the first controller has to perform an access process every time an access from the second controller occurs. This, as a result, may affect the control cycle of the first control that is the main control that should be performed by the first controller.

However, with the PLC system 200 described above, the analog input unit 230 includes, for each of the A/D conversion parameter and the logging parameter, an analysis processing unit that performs an analysis process after the parameter reception unit 234 receives parameters and a storage unit that stores therein parameters that have been analyzed. Accordingly, with the PLC system 200, the main controller 210 and the sub-controller 220 can separately access the analog input unit 230 and thus can separately manage and control difference functions in the analog input unit 230. Therefore, the problem with the configuration of the CPU system disclosed in Cited Reference 3 does not occur.

Furthermore, the main controller 210 sequentially reads digital values that are obtained by A/D conversion and uses them as input information for control, and the sub-controller 220 reads and stores a sequence of digital values collected by the analog input unit, thereby enabling the control and the data collection to be separated. Accordingly, there is an effect in that the control can be continued without increasing the processing load on the main controller 210 and the logging can be executed by the sub-controller 220.

Moreover, in the analog input unit, such as the analog input unit 230, there is often a case where the required processing speed is different in the A/D conversion process and in the logging process. However, with the PLC system 200 described above, the main controller 210 and the sub-controller 220 can separately access the analog input unit 230 and thus can, respectively, manage and control the A/D conversion process and the logging process performed by the analog input unit 230 separately. Therefore, with the PLC system 200, each of the A/D conversion process and the logging process can be controlled at the process speed required for the corresponding control.

As described above, according to the present embodiment, an effect is obtained where different functions in one functional unit in the PLC system can be separately controlled by a plurality of control units.

INDUSTRIAL APPLICABILITY

As described above, the functional unit according to the present invention is useful in the case where different functions in one functional unit in a programmable controller are controlled by a plurality of control units.

REFERENCE SIGNS LIST

100 PLC system, 110 main controller, 111 communication unit, 112 main control unit, 113 internal memory, 114 internal bus, 120 sub-controller, 121 communication unit, 122 sub-control unit, 123 internal memory, 124 internal bus, 130 PLC functional unit, 131 communication unit, 132 main-control processing unit, 133 sub-control processing unit, 134 parameter reception unit, 135 main-control-parameter analysis unit, 136 main-control-parameter storage unit, 137 sub-control-parameter analysis unit, 138 sub-control-parameter storage unit, 139 internal bus, 140 calculation unit, 141 shared memory, 150 inter-unit bus, 200 PLC system, 210 main controller, 211 communication unit, 212 control calculation unit, 213 internal memory, 214 internal bus, 220 sub-controller, 221 communication unit, 222 data collection unit, 223 internal memory, 224 internal bus, 230 analog input unit, 231 communication unit, 232 A/D conversion unit, 233 data collection unit, 234 parameter reception unit, 235 A/D-conversion-parameter analysis unit, 236 A/D-conversion-parameter storage unit, 237 logging-parameter analysis unit, 238 logging-parameter storage unit, 239 internal bus, 240 calculation unit, 241 shared memory, 242 analog data input unit, 250 inter-unit bus.

The invention claimed is:

1. A functional device that is included in a programmable controller system that includes a plurality of controllers having different control functions, wherein
there are, as a type of classification of a parameter that is output from the controllers and input to the functional device, at least a first parameter, which is output from a first controller of the controllers and is used for setting control of a first function in the functional device, and a second parameter, which is output from a second controller of the controllers and is used for setting control of a second function in the functional device,
the functional device is implemented as hardware and comprises performs the functions of:
when the input parameter is any of the first parameter and the second parameter, classifying the input parameter as a corresponding type out of the first parameter and the second parameter;
analyzing the classified first parameter;
analyzing the classified second parameter;
storing, in a first-parameter storage, the analyzed first parameter;
storing, in a second-parameter storage, the analyzed second parameter;
controlling, by using a first processor, the first function in accordance with the first parameter stored in the first-parameter storage; and
controlling, by using a second processor, the second function in accordance with the second parameter stored in the second-parameter storage, wherein
the first processor performs the first function,
the second processor performs the second function,
the first function and the second function are performed separately from each other,
the functional device is controlled by the plurality of controllers to thereby control physical operations of external industrial equipment based on the first function and the second function, and
in response to the functional device classifying the input parameter as the second parameter, the functional device controls the second processor to stop the control of the second function while controlling the first processor to simultaneously continue the control of the first function.

2. The functional device according to claim 1, wherein when the functional device receives the second parameter from the second controller during control of the first function by the first processor and control of the second function by the second processor,
the functional device controls the first processor to continue control of the first function,
the functional device controls the second processor to stop control of the second function, and
the second parameter analyzed by the functional device is stored in the second-parameter storage as a new parameter based on the analysis.

3. The functional device according to claim 1, wherein the first controller is a controller that controls a main function in the programmable controller system, and the second controller is a controller that controls an auxiliary function in the programmable controller system.

4. A programmable controller system that includes a plurality of controllers having different control functions and a functional device, wherein
a first controller of the controllers outputs, to the functional device, a first parameter used for setting control of a first function in the functional device,
a second controller of the controllers outputs, to the functional device, a second parameter used for setting control of a second function in the functional device,
there are, as a type of classification of a parameter that is output from the controllers and input to the functional device, at least the first parameter and the second parameter, and
the functional device is implemented as hardware and performs the functions of:

when the input parameter is any of the first parameter and the second parameter, classifying the input parameter as a corresponding type out of the first parameter and the second parameter,
analyzing the classified first parameter,
analyzing the classified second parameter,
storing, in a first-parameter storage, the analyzed first parameter,
storing, in a second-parameter storage, the analyzed second parameter,
controlling, by using a first processor, the first function in accordance with the first parameter stored in the first-parameter storage, and
controlling, by using a second processor, the second function in accordance with the second parameter stored in the second-parameter storage, wherein
the first processor performs the first function,
the second processor performs the second function,
the first function and the second function are performed separately from each other,
the functional device is controlled by the plurality of controllers to thereby control physical operations of external industrial equipment based on the first function and the second function, and
in response to the functional device classifying the input parameter as the second parameter, the functional device controls the second processor to stop the control of the second function while controlling the first processor to simultaneously continue the control of the first function.

5. The programmable controller system according to claim 4, wherein
when the functional device receives the second parameter from the second controller during control of the first function by the first processor and control of the second function by the second processor,
the functional device controls the first processor to continue control of the first function,
the functional device controls the second processor to stop control of the second function, and
the second parameter analyzed by the functional device is stored in the second-parameter storage as a new parameter based on the analysis.

6. The programmable controller system according to claim 4, wherein
the first controller is a controller that controls a main function in the programmable controller system, and
the second controller is a controller that controls an auxiliary function in the programmable controller system.

7. An analog input device that is included in a programmable controller system that includes a plurality of controllers having different control functions, wherein
there are, as a type of classification of a parameter that is output from the controllers and input to the analog input device, at least an analog/digital (A/D) conversion parameter, which is output from a first controller of the controllers and is used for setting control of an A/D conversion function in the analog input device, and a logging parameter, which is output from a second controller of the controllers and is used for setting control of a data collection function of collecting an execution result of the A/D conversion function in the analog input device, the first controller taking on control of A/D conversion, the second controller taking on control of data collection;

the analog input device is implemented as hardware and performs the functions of:
when the input parameter is any of the A/D conversion parameter and the logging parameter, classifying the input parameter as a corresponding type out of the A/D conversion parameter and the logging parameter;
analyzing the classified A/D conversion parameter;
analyzing the classified logging parameter;
storing, in an A/D-conversion-parameter storage, the analyzed A/D conversion parameter;
storing, in a logging-parameter storage, the analyzed logging parameter;
controlling, by using an A/D-conversion processor, the A/D conversion function in accordance with the A/D conversion parameter stored in the A/D-conversion-parameter storage; and
controlling, by using a data collection processor, the data collection function in accordance with the logging parameter stored in the logging-parameter storage, wherein
the A/D-conversion processor performs the A/D conversion function,
the data collection processor performs the data collection function,
the A/D conversion function and the data collection function are performed separately from each other,
the analog input device is controlled by the plurality of controllers to thereby control physical operations of external industrial equipment based on the A/D conversion function and the data collection function, and
in response to the analog input device classifying the input parameter as the data collection function, the analog input device controls the data collection processor to stop the control of the data collection function while controlling the A/D-conversion processor to simultaneously continue control of the A/D conversion function.

8. The analog input device according to claim 7, wherein
when the analog input device receives the logging parameter from the second controller during control of the A/D conversion function by the A/D-conversion processor and control of the data collection function by the data collection processor,
the analog input device controls the A/D-conversion processor to continue control of the A/D conversion function,
the analog input device controls the data collection processor to stop control of the data collection function, and
the logging parameter analyzed by the analog input device is stored in the logging-parameter storage as a new parameter based on the analysis.

9. A programmable controller system that comprises a plurality of controllers having different control functions and an analog input device, the controllers including a first controller controlling the programmable controller system and the second controller controlling data collection, wherein
the first controller outputs, to the analog input device, an analog/digital (A/D) conversion parameter used for setting control of an A/D conversion function in the analog input device,
the second controller outputs, to the analog input device, a logging parameter used for setting control of a data collection function in the analog input device, there are, as a type of classification of a parameter that is output from the controllers and input to the analog input device, at least the A/D conversion parameter and the logging parameter, and the analog input device is implemented as hardware and performs the functions of:

when the input parameter is any of the A/D conversion parameter and the logging parameter, classifying the input parameter as a corresponding type out of the A/D conversion parameter and the logging parameter, analyzing the classified A/D conversion parameter, analyzing the classified logging parameter, storing, in an A/D-conversion-parameter storage, the analyzed A/D conversion parameter, storing, in a logging-parameter storage, the analyzed logging parameter, controlling, by using an A/D-conversion processor, the A/D conversion function in accordance with the A/D conversion parameter stored in the A/D-conversion-parameter storage, and controlling, by using a data collection processor, the data collection function in accordance with the logging parameter stored in the logging-parameter storage, and the A/D-conversion processor performs the A/D conversion function, the data collection processor performs the data collection function, the A/D conversion function and the data collection function are performed separately from each other, the analog input device is controlled by the plurality of controllers to thereby control physical operations of external industrial equipment based on the A/D conversion function and the data collection function, and in response to the analog input device classifying the input parameter as the data collection function, the analog input device controls the data collection processor to stop the control of the data collection function while controlling the A/D-conversion processor to simultaneously continue control of the A/D conversion function.

10. The programmable controller system according to claim 9, wherein when the analog input device receives the logging parameter from the second controller during control of the A/D conversion function by the A/D-conversion processor and control of the data collection function by the data collection processor, the analog input device controls the A/D-conversion processor to continue control of the A/D conversion function, the analog input device controls the data collection processor to stop control of the data collection function, and the logging parameter analyzed by the analog input device is stored in the logging-parameter storage as a new parameter based on the analysis.

\* \* \* \* \*